(12) United States Patent
Jain et al.

(10) Patent No.: US 10,172,089 B2
(45) Date of Patent: Jan. 1, 2019

(54) LOW POWER LOCATION TRACKING DEVICE

(71) Applicant: QUALCOMM Incorporated, San Diego, CA (US)

(72) Inventors: Nikhil Jain, San Diego, CA (US); Hiren Bhagatwala, San Diego, CA (US); Dave Huntingford, Scottsdale, AZ (US)

(73) Assignee: Qualcomm Incorporated, San Diego, CA (US)

( * ) Notice: Subject to any disclaimer, the term of this patent is extended or adjusted under 35 U.S.C. 154(b) by 11 days.

(21) Appl. No.: 15/395,609

(22) Filed: Dec. 30, 2016

(65) Prior Publication Data

US 2018/0192374 A1    Jul. 5, 2018

(51) Int. Cl.
*H04W 52/02* (2009.01)
*H04W 4/02* (2018.01)
*H04W 4/029* (2018.01)

(52) U.S. Cl.
CPC ....... *H04W 52/0254* (2013.01); *H04W 4/027* (2013.01); *H04W 4/029* (2018.02)

(58) Field of Classification Search
CPC .. H04W 52/0254; H04W 4/027; H04W 4/028
See application file for complete search history.

(56) References Cited

U.S. PATENT DOCUMENTS

| | | | | |
|---|---|---|---|---|
| 6,975,941 B1* | 12/2005 | Lau | ............ | G01C 21/00 340/539.13 |
| 8,058,987 B1* | 11/2011 | Battista | ............ | G06Q 10/047 340/539.13 |
| 9,191,897 B2 | 11/2015 | Morrison et al. | | |
| 2003/0050038 A1* | 3/2003 | Haave | ............ | B60R 25/102 455/404.1 |
| 2007/0210920 A1 | 9/2007 | Panotopoulos | | |
| 2008/0231449 A1 | 9/2008 | Moshfeghi | | |
| 2013/0090134 A1* | 4/2013 | Heshmati | ............ | H04W 52/0245 455/456.3 |

(Continued)

FOREIGN PATENT DOCUMENTS

WO    2014081956 A2    5/2014

OTHER PUBLICATIONS

"A Picowatt Powered Carbon-Nanotube-Based Thermal Convective Motion Sensor". Zhang et al. IEEE Transactions on Nanotechnology, vol. 10, No. 5, Sep. 2011.*

*Primary Examiner* — Nathan Mitchell
(74) *Attorney, Agent, or Firm* — Kilpatrick Townsend & Stockton, LLP

(57) ABSTRACT

Disclosed herein are techniques for reducing power consumption of an electronic tracking device. The electronic tracking device includes a wireless communication subsystem and an always-on low-power sensor for sensing the motions of the electronic tracking device. A controller of the electronic tracking device controls the operations of the wireless communication subsystem based on the detection signals from the always-on low-power sensor such that the wireless communication subsystem is only activated when motions of the electronic tracking device have stopped for a threshold period of time, or when a query from a server is received when the wireless communication subsystem is in a standby mode.

27 Claims, 8 Drawing Sheets

(56) References Cited

U.S. PATENT DOCUMENTS

| | | | |
|---|---|---|---|
| 2013/0324152 A1* | 12/2013 | Lee | H04W 64/006 |
| | | | 455/456.1 |
| 2014/0087710 A1* | 3/2014 | Kusakari | H04W 64/006 |
| | | | 455/418 |
| 2015/0187153 A1 | 7/2015 | Davis et al. | |
| 2015/0346347 A1 | 12/2015 | Tsai et al. | |
| 2016/0205500 A1* | 7/2016 | Lee | H04W 4/02 |
| | | | 455/456.4 |

* cited by examiner

LOW POWER LOCATION TRACKING DEVICE

BACKGROUND

Electronic tracking devices can be used to track various objects, such as luggage, vehicles, pets, wallets, cargo, or any other movable objects. Such tracking devices are often powered by batteries. In many applications, it is desirable that an electronic tracking device consumes less power, in order to achieve a long battery life yet still minimize the size of the battery and the overall size of the electronic tracking device.

BRIEF SUMMARY

Techniques disclosed herein relate to reducing power consumption of an electronic tracking device. More specifically, the electronic tracking device includes a wireless communication subsystem and one or more always-on low-power sensors for sensing the motions of the electronic tracking device. A controller may control the operations of the wireless communication subsystem based on the outputs of the low-power sensors. The wireless communication subsystem may normally stay in a power-off mode, and may only be powered on to obtain and report its current location when no motion of the electronic tracking device has been detected for a certain time period. Alternatively or additionally, the wireless communication subsystem may be set to a standby mode when a motion of the electronic tracking device is detected, and may be activated to obtain and report its current location when a query is received while the wireless communication subsystem is in the standby mode or when no motions of the electronic tracking device have been detected for a certain time period.

In accordance with an example implementation, an electronic tracking device may include a controller, a motion sensor in communication with the controller, and a wireless communication subsystem in communication with the controller. The motion sensor may be configured to detect a motion of the electronic tracking device. The controller may include instructions stored thereon that, when executed, cause the controller to (a) activate the wireless communication subsystem when no motion of the electronic tracking device has been detected by the motion sensor for a threshold time period after a first motion of the electronic tracking device is detected by the motion sensor; (b) cause location information of the electronic tracking device to be obtained; (c) cause the location information of the electronic tracking device to be sent to a server using the wireless communication subsystem; and (d) deactivate the wireless communication subsystem after the location information of the electronic tracking device is sent to the server. In some embodiments, the instructions, when executed, may cause the controller to repeat operations (a)-(d) in a loop, while the wireless communication subsystem remains deactivated between iterations of the loop.

In some embodiments of the electronic tracking device, the motion sensor may include at least one of an accelerometer, a gyroscope, or a velocimeter. The motion sensor may be an low-power sensor that remains powered on when the wireless communication subsystem is deactivated. In some embodiments, the motion sensor may have a power consumption less than 1 nanowatt.

In some embodiments of the electronic tracking device, the controller may include a false detection prevention logic to prevent false motion detection. In some embodiments, the wireless communication subsystem may include at least one of a cellular communication subsystem, a Wi-Fi communication subsystem, or a Satellite Positioning System (SPS) communication subsystem. The location information of the electronic tracking device may be obtained by the wireless communication subsystem, and the wireless communication subsystem may include a processor for determining a location of the electronic tracking device.

In some embodiments of the electronic tracking device, the instructions, when executed, may cause the controller to set the wireless communication subsystem to a standby mode, after a motion of the electronic tracking device is detected by the motion sensor while the wireless communication subsystem is deactivated. In some embodiments, before entering the standby mode, the wireless communication subsystem may register with a wireless network such that, in the standby mode, the wireless communication subsystem is communicatively accessible via the wireless network. In some embodiments, the instructions, when executed, may cause the controller to, in response to a query of the location information of the electronic tracking device, activate the wireless communication subsystem from the standby mode, cause the location information of the electronic tracking device to be determined and transmitted to the server, and set the wireless communication subsystem back to the standby mode. In some embodiments, the controller may respond to a query from a server, but may deny a query directly from a user. In some embodiments, the threshold time period may be determined based on energy used to power up and initialize the wireless communication subsystem and power consumption of the electronic tracking device in the standby mode.

In some embodiments, the electronic tracking device may include an alarm signal generator configured to generate an alarm signal when a query of the location information of the electronic tracking device is received or when an abnormal event is detected. In some embodiments, the electronic tracking device may include a sensor configured to generate a detection signal indicating whether the electronic tracking device is on an aircraft. When the detection signal indicates that the electronic tracking device is on an aircraft, the controller may set the wireless communication subsystem to a standby mode or deactivate the wireless communication subsystem. In some embodiments, the electronic tracking device may include at least one of an ambient light sensor, a pressure sensor, a vibration sensor, a temperature sensor, a humidity sensor, a shock sensor, a chemical sensor, or a biometric sensor. In some embodiments, the electronic tracking device may include a sensor hub coupled to the controller and at least one of the motion sensor, an ambient light sensor, a pressure sensor, a vibration sensor, a temperature sensor, a humidity sensor, a shock sensor, a chemical sensor, or a biometric sensor.

In accordance with an example implementation, a method for reducing the power consumption of an electronic tracking device may include receiving detection signals from a motion sensor of the electronic tracking device, and, after determining that the detection signals indicate that motions of the electronic tracking device have stopped for a threshold time period after a first motion of the electronic tracking device is detected by the motion sensor, activating a wireless communication subsystem of the electronic tracking device; causing location information of the electronic tracking device to be obtained; causing the location information of the electronic tracking device to be sent to a server using the wireless communication subsystem; and deactivating the wireless communication subsystem after the location information of the electronic tracking device is sent to the server.

In some embodiments of the method, the motion sensor may include at least one of an accelerometer, a gyroscope, or a velocimeter. The wireless communication subsystem may include at least one of a cellular communication subsystem, a Wi-Fi communication subsystem, or a Satellite Positioning System (SPS) communication subsystem.

In some embodiments, the method may include powering up the wireless communication subsystem, when the detection signals indicate that a motion has been detected while the wireless communication subsystem is deactivated; causing the wireless communication subsystem to register with a wireless network; and setting the wireless communication subsystem to a standby mode. In some embodiments, the method may further include, in response to a query of the location information of the electronic tracking device, activating the wireless communication subsystem from the standby mode; causing the location information of the electronic tracking device to be determined and transmitted to the server; and setting the wireless communication subsystem back to the standby mode. In some embodiments, the method may include, when the detection signals from the motion sensor indicate that no motions of the electronic tracking device have been detected for the threshold time period, activating the wireless communication subsystem from the standby mode; causing the location information of the electronic tracking device to be determined and transmitted to the server; and deactivating the wireless communication subsystem.

In some embodiments, the method may include generating an alarm signal when a query of the electronic tracking device is received or when an abnormal event is detected. In some embodiments, the method may include receiving, from a second sensor, a detection signal indicating whether the electronic tracking device is on an aircraft; and setting the wireless communication subsystem to a standby mode or deactivating the wireless communication subsystem in response to the detection signal indicating that the electronic tracking device is on the aircraft.

In accordance with another example implementation, an apparatus may be provided, which may include means for detecting motions of an object, means for receiving detection signals from the means for detecting motions, means for obtaining and reporting location information of the object to a server, and means for determining that motions of the object have stopped for a threshold period of time based on the detection signals. The apparatus may also include means for activating the means for obtaining and reporting location information, when motions of the object have stopped for the threshold period of time after a first motion of the object is detected; and means for deactivating the means for obtaining and reporting the location information after the location information of the object is reported to the server.

In some embodiments, the apparatus may also include means for causing the means for obtaining and reporting the location information to register with a wireless network; means for setting the means for obtaining and reporting the location information to a standby mode; and means for, in response to a query of the location information of the object, activating the means for obtaining and reporting the location information from the standby mode. The apparatus may also include means for causing the location information of the object to be determined and reported to the server, and means for setting the means for obtaining and reporting the location information back to the standby mode.

In accordance with yet another example implementation, a non-transitory computer-readable storage medium including machine-readable instructions stored thereon is disclosed. The instructions, when executed by one or more processing units, may cause the one or more processing units to receive detection signals from a motion sensor of an electronic tracking device; determine that the detection signals indicate that motions of the electronic tracking device have stopped for a threshold period of time after a first motion of the electronic tracking device is detected by the motion sensor; and activate a wireless communication subsystem of the electronic tracking device. The instructions, when executed by the one or more processing units, may further cause the one or more processing units to cause location information of the electronic tracking device to be obtained; cause the location information of the electronic tracking device to be sent to a server using the wireless communication subsystem; and deactivate the wireless communication subsystem after the location information of the electronic tracking device is sent to the server.

In some embodiments of the non-transitory computer-readable storage medium, the instructions, when executed by the one or more processing units, may further cause the one or more processing units to power up the wireless communication subsystem, when the detection signals indicate that a motion has been detected while the wireless communication subsystem is deactivated; cause the wireless communication subsystem to register with a wireless network; and set the wireless communication subsystem to a standby mode.

In some embodiments of the non-transitory computer-readable storage medium, the instructions, when executed by the one or more processing units, may further cause the one or more processing units to, in response to a query of the location information of the electronic tracking device, activate the wireless communication subsystem from the standby mode; cause the location information of the electronic tracking device to be determined and transmitted to the server; and set the wireless communication subsystem to the standby mode.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
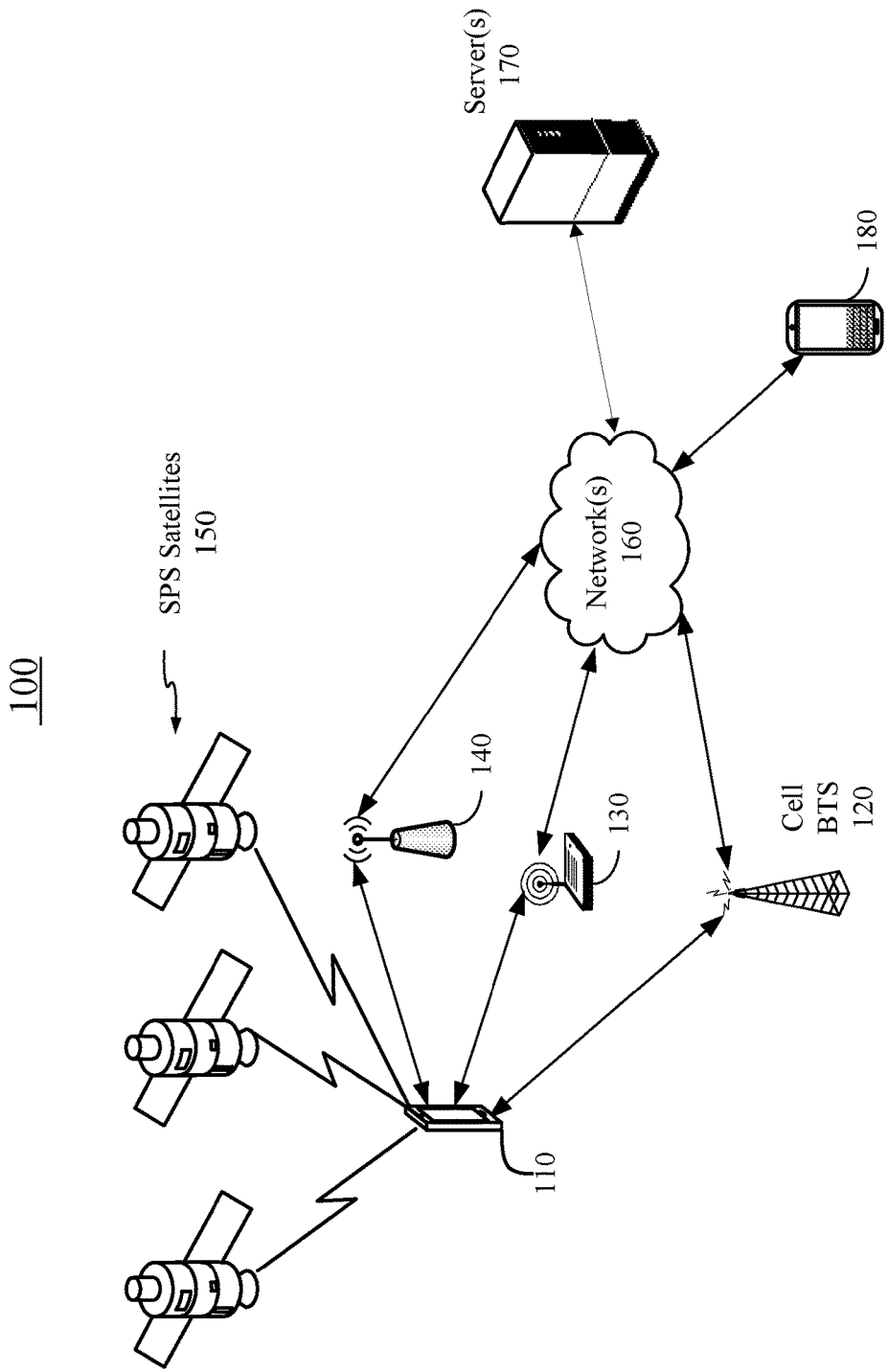
FIG. 1 is a simplified illustration of an example tracking system, according to certain aspects of the present disclosure.

Several illustrative embodiments will now be described with respect to the accompanying drawings, which form a part hereof. The ensuing description provides embodiment(s) only, and is not intended to limit the scope, applicability, or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Electronic tracking devices can be used to track various objects, such as luggage, vehicles, pets, keys, wallets, cellphones, cargo, and any other movable objects. The electronic tracking devices may often include a wireless communication subsystem for communicating with external devices or networks wirelessly. The wireless communication subsystem may consume considerable amount of power when being activated. On the other hand, these electronic tracking devices are often powered by batteries which may store limited amount of energy. Thus, the operation time of the battery and thus the operation time of the electronic tracking device may be limited. In many applications, it is desirable that an electronic tracking device consumes less power, such that the size of the battery and the overall size of the electronic tracking device can be reduced or minimized, while the battery can still last a long period of time.

Some electronic tracking devices may determine and report location information whenever a motion is detected. Some electronic tracking devices may be in or attempt to be in a standby mode most of the time. Some electronic tracking devices may regularly determine and report their locations at, for example, every half hour, every hour, every two hours, etc. Some electronic tracking devices may directly answer a user query when the query is made by a user. These electronic tracking devices may consume a large amount of energy in a given time period, and therefore may require frequent battery replacement or recharge. To reduce the overall power consumption, some electronic tracking devices may be designed to shut off after operating for a certain time period. However, the electronic tracking devices may not be trackable after they are shut off and may not provide sufficient information regarding the travelling or movement of the electronic tracking devices.

Techniques disclosed herein relate to an electronic tracking device (ETD) for tracking any tangible, movable objects, such as luggage, vehicles, pets, wallets, bags, cargo, or mobile electronic devices. The ETD may include a wireless communication subsystem that can be used to obtain location information of the ETD and report the location information of the ETD to a server through a communication network. The power consumption of the wireless communication subsystem may be relatively high, and thus the battery life may be limited and/or the required battery may be large if the wireless communication subsystem remains on during a long period of time. The overall power consumption of the wireless communication subsystem, and thus the size of the battery of the electronic tracking device, can be reduced by only turning on the wireless communication subsystem when the location of the ETD is to be determined and reported to a server, such as when the ETD has not been in motion for a certain period of time or when a query from a server is received when the wireless communication subsystem is in a standby mode. The last reported location of the ETD may be provided by the server to a user as the current location of the ETD in response to a user request for locating the ETD and the associated movable object. The operation of the wireless communication subsystem and the ETD may be controlled by a low-power controller using a low-power always-on sensor for detecting the motions of the ETD.

FIG. 1 is a simplified illustration of an example tracking system 100 according to certain aspects of the present disclosure, which may be used to implement various techniques disclosed herein. Tracking system 100 may include one or more cellular base transceiver stations 120, one or more Wi-Fi or small cell access points 130, one or more wireless transceivers 140 (e.g., Bluetooth, Bluetooth Low Energy (BLE), or ZigBee transceivers on stationary or mobile devices), one or more Satellite Positioning System (SPS) satellites 150, one or more communication networks 160, and one or more servers 170, for tracking one or more ETDs 110. ETDs 110 and/or some constituents of tracking system 100, such as Wi-Fi or small cell access points 130, may be used to determine the position of ETDs 110. A user device 180, such as a computer or a mobile device (e.g., a cellular phone), may be used by a user to query the location of an ETD from one or more servers 170 through one or more communication networks 160. It should be noted that FIG. 1 provides only a generalized illustration of various components, any or all of which may be utilized as appropriate, and each of which may be duplicated as appropriate. Specifically, although only one ETD 110 is illustrated, it will be understood that many ETDs (e.g., hundreds, thousands, or more) may be utilized in tracking system 100. Similarly, tracking system 100 may include many base transceiver stations (similar to base transceiver station 120) and/or Wi-Fi or small cell access points 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

Base transceiver station(s) 120 may include one or more antennas for communicating with ETDs 110. Base transceiver station(s) 120 may also be communicatively coupled to network(s) 160 (e.g., a cellular network), which may be communicatively coupled with server(s) 170. Thus, ETD(s) 110 can communicate information with server(s) 170, for example, by accessing network(s) 160 via base transceiver station(s) 120. Tracking system 100 may include a plurality of Wi-Fi or small cell access points 130, which may communicate with a nearby ETD and network(s) 160. Similarly, tracking system 100 may include a plurality of other wireless transceivers 140 coupled to network(s) 160. Wireless transceivers 140 may communicate with a nearby ETD using, for example, Bluetooth or ZigBee technologies. Although FIG. 1 shows ETD 110 having a communication link with only one base transceiver station 120, one Wi-Fi or small cell access point 130, or one wireless transceiver 140, other configurations or embodiments may allow for multiple communication links with multiple base transceiver stations, Wi-Fi access points, or other wireless transceivers.

A location of ETD 110 may be determined in any of a variety of ways by ETD 110 and/or other devices in communication with ETD 110. For example, the location of an ETD may be determined based on measurements of wireless signals transmitted by multiple SPS satellites 150 or base transceiver station(s) 120 made by the ETD. Techniques for determining the location of an ETD may include, for example, trilateration and triangulation techniques. In some examples, the location of an ETD may be determined based on the location of a Wi-Fi access point or a wireless transmitter (e.g., Bluetooth transmitter) that is close to the ETD. In some embodiments, crowdsourced information from, for example, ETDs, base transceiver stations, and Wi-Fi access points, may be used to determine the location of an ETD by, for example, server(s) 170. In some embodiments, the measurements may include received signal strength indicator (RSSI) and/or round trip time (RTT) measurements between ETDs and various components of tracking system 100.

Air interface types (or technologies) and techniques used for determining the locations of ETDs may depend on the required accuracy and/or the availability of wireless coverage of various air interface types. For example, if a location accuracy of one kilometer or better is required, a cellular communication technology, such as a 2G/3G/4G cellular communication standard may be used. If a location accuracy of 50 meters or better is required, a Wi-Fi communication technology may be used.

In various embodiments, a network 160 may provide connectivity to one or more other wired and/or wireless networks included in tracking system 100. For example, network(s) 160 may be an Internet Protocol (IP) network, such as the Internet. Network(s) 160 may also be a mobile network provider's private network.

In one or more arrangements, network(s) 160 may include a wireless network subsystem, which may include one or more systems and components for providing wireless telephony and data networks, such as one or more gateways, switches, routers, controllers, registers, billing centers, service centers, mobile switching centers, small cells, base station controllers, and/or other systems and components. These systems and components may, for example, enable a wireless network subsystem to control one or more base transceiver stations or Wi-Fi or small cell access points, which may transmit and/or receive radio frequency (RF) signals to and/or from one or more ETDs.

In one or more arrangements, network(s) 160 may include a broadband network gateway, which may include one or more systems and components for providing wired telephony and data networks, such as one or more gateways, switches, and/or routers, as well as one or more optical, coaxial, and/or hybrid fiber-coaxial lines, one or more satellite links, one or more radio links, and/or other systems and components. These systems and components may, for example, enable a broadband network gateway to provide telephone services and/or data/Internet access to one or more user devices at various locations.

Server(s) 170 may be configured to access and/or maintain a database in which information about the locations of ETDs at different time instants may be stored. In some embodiments, information regarding wireless signals observed at various locations by one or more ETDs and/or other components of tracking system 100 may be stored in a database accessible by server(s) 170 to determine a location of an ETD at a given time.

User device 180 may be used by a user to track an ETD. User device 180 may be a mobile or non-mobile device that has access to one or more telephonic or data networks. For example, user device 180 may be a cellphone, a computer, a touchpad, or a terminal. User device 180 may run a user application or a web browser to provide a user interface between the user and networks 160 and servers 170, through which the user may request an update of the location of the ETD or the status of the ETD.

Figure 2:
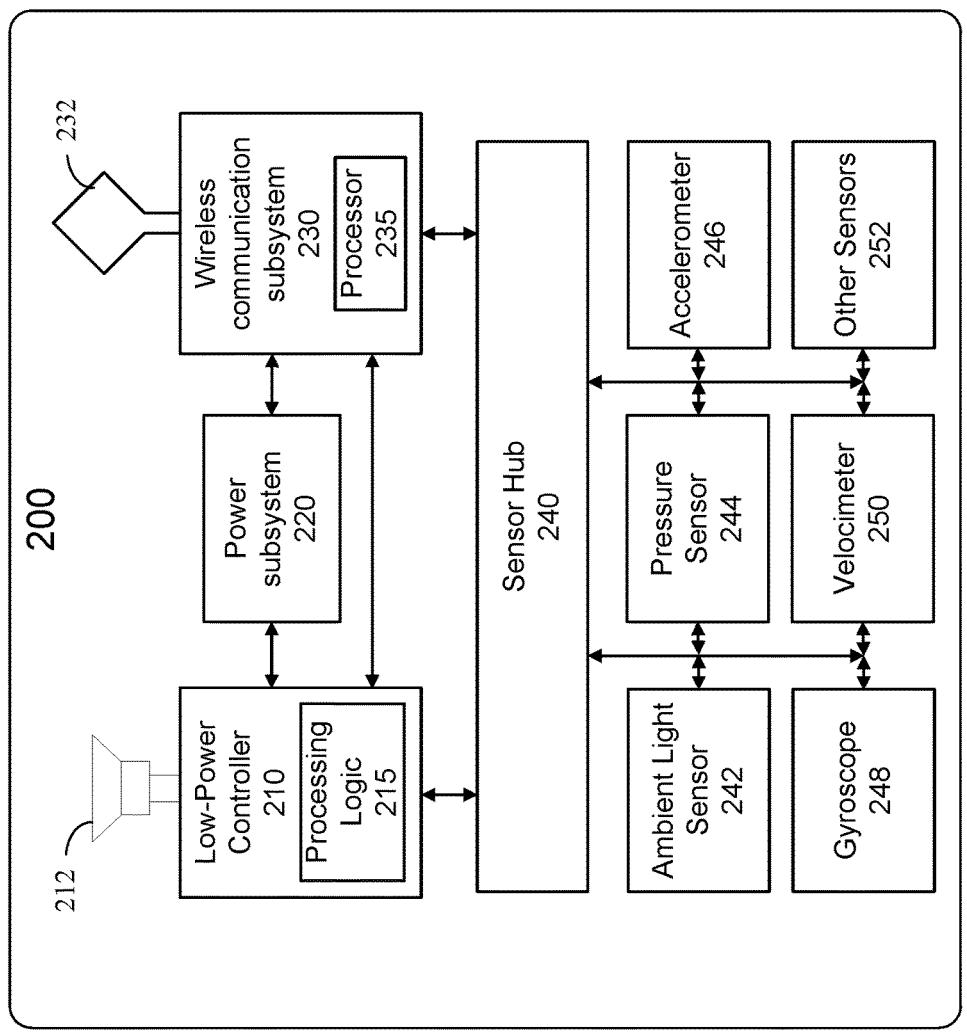
FIG. 2 is a simplified block diagram of an example electronic tracking device, according to certain aspects of the present disclosure.

FIG. 2 is a simplified block diagram of an example electronic tracking device 200, according to certain aspects of the present disclosure. ETD 200 may include a low-power controller 210 for controlling the operations of a power subsystem 220, a wireless communication subsystem 230, and a sensor hub 240, based on information gathered by various sensors on ETD 200.

Power subsystem 220 may include one or more rechargeable or non-rechargeable batteries, such as alkaline batteries, lead-acid batteries, lithium-ion batteries, zinc-carbon batteries, and NiCd or NiMH batteries. Power subsystem 220 may also include one or more power management circuits, such as voltage regulators, DC-to-DC converters, wired or wireless charging circuits, and energy harvest circuits, etc. In some embodiments, power subsystem 220 may include a real-time clock using, for example, a watch crystal or other crystals.

Wireless communication subsystem 230 may include a processor 235 and one or more of a cellular communication subsystem, a Global Positioning System (GPS) communication subsystem, a Wi-Fi transceiver, a Bluetooth, BLE, or ZigBee transceiver, or other wireless communication subsystems, such as a near-field communication (NFC) subsystem. Wireless communication subsystem 230 may be connected to or include one or more antennas 232, such as a printed antenna (e.g., a microstrip or patch antenna) or antenna array. Wireless communication subsystem 230 may be operable to be powered on, powered off, or in a standby (i.e., sleep) mode. When powered on, wireless communication subsystem 230 may communicate with other components of a tracking system as described above with respect to FIG. 1, collect information for determining a location of ETD 200, determine the location of ETD 200 using, for example, processor 235, and report the location information of ETD 200 or send information that may be used to determine the location of ETD 200 to a server through other components of the tracking system, such as base transceiver stations, access points, networks. When powered off, circuits in wireless communication subsystem 230 may consume no power. When in a standby mode, only a small portion of wireless communication subsystem 230 may be activated, while the rest of wireless communication subsystem 230 may be deactivated or powered off. For example, in some embodiments, a wireless receiver, a wireless signal detector, or a wireless sniffer may remain powered on for receiving queries from the server, and other circuits are powered off. In some embodiments, when a circuit or subsystem is deactivated, the circuit or subsystem may be completely powered down and may consume no power. In some other embodiments, when a circuit or subsystem is deactivated, the circuit or subsystem may not be completely powered down but may consume a low or minimum level of power.

Sensor hub 240 may be an optional circuit or may be integrated into low-power controller 210. Sensor hub 240 may control the operations of various sensors and/or wireless communication subsystem 230. For example, in some embodiments, sensor hub 240 may implement a "Flight Safe" or "Airplane Safe" mode based on inputs from the sensors (e.g., an altimeter). In the "Flight Safe" or "Airplane Safe" mode when ETD 200 is on an airplane, all voice and text telephony and other signal-transmitting technologies, such as Wi-Fi and Bluetooth, may be suspended. In some cases, Wi-Fi or Bluetooth communication may be enabled manually by a user even while the device is in the "Flight Safe" or "Airplane Safe" mode.

In various embodiments, ETD 200 may include various sensors, such as, for example, an ambient light sensor 242, a pressure sensor 244, an accelerometer 246, a gyroscope 248, and a velocimeter 250. ETD 200 may also include other sensors 252, such as an altimeter, a vibration sensor, a temperature sensor, a humidity sensor, a shock sensor, a chemical sensor, a biometric sensor, etc. These sensors, such as accelerometer 246, gyroscope 248, and/or velocimeter 250, may be used to detect a motion of ETD 200, such as the acceleration, deceleration, or moving speed of ETD 200. Other sensors, such as ambient light sensor 242, pressure sensor 244, the vibration sensor, the temperature sensor, the humidity sensor, or the shock sensor, may be used to monitor the environment, physical forces applied to ETD 200 and associated objects (e.g., a bag), and/or chemicals that the ETD is exposed to. For example, in some cases, if an object attached to the ETD is stolen and physically intruded or damaged, or is experiencing a pressure or force that is beyond the endurable limit of the object, the sensors may detect the forces and send an alarm signal. The biometric sensor, such as a fingerprint sensor, may be used for security purposes. In some cases, if the temperature sensor determines that the ambient temperature or the temperature of the ETD (e.g., the battery of ETD 200) is high, low-power controller 210 may switch off power subsystem 220 and other circuits of ETD 200. The altimeter may be used to determine whether the ETD is on an aircraft. In various embodiments, some of these sensors may be always-on, while some other sensors may only be turned on at a certain time under the control of sensor hub 240. For example, in an example ETD, a low-power always-on motion sensor may be always-on, and other sensors may only be turned on after a motion is detected by the low-power motion sensor.

The above described sensors may be implemented using various technologies known to a person skilled in the art. For example, accelerometer 246 may be implemented using piezoelectric, piezo-resistive, capacitive, or micro electro-mechanical systems (MEMS) components. Accelerometer 246 may include a two-axis or multiple-axis accelerometer.

Low-power controller 210 may receive information detected by the various sensors and determine, using a processing logic 215, whether and when to activate or deactivate wireless communication subsystem 230. Processing logic 215 may include a processor (e.g., ARM® or MIPS® processor), a microcontroller, or an application specific integrated circuit (ASIC). Example operations of low-power controller 210 and ETD 200 are described in detail below.

In some implementations, ETD 200 may also include a speaker 212, which may be controlled by low-power controller 210 to generate an alarm or other signaling sounds. For example, when a user is trying to locate an object with an ETD attached to it, low-power controller 210 may turn on speaker 212 to generate a signaling sound, such as a beeping sound. Alternatively or additionally, in some implementations, a photodiode or a light-emitting diode (LED) (not shown) may be used and controlled by low-power controller 210 to generate a signaling light beam. In some implementations, an alarm signal may be generated when an abnormal event is detected. For example, an alarm signal may be generated when a physical force applied to the ETD is above a threshold value, such as when the object attached to the ETD hits ground, endures a heavy load, or is physically broken in or broken.

In some embodiments, ETD 200 may include a datalogger, which may record the information detected by the sensors when an event is detected. For example, the datalogger may record the time when an initial motion is detected, the time when wireless communication subsystem 230 is turned on or off, or the time when an excessive force is detected.

Figure 3:
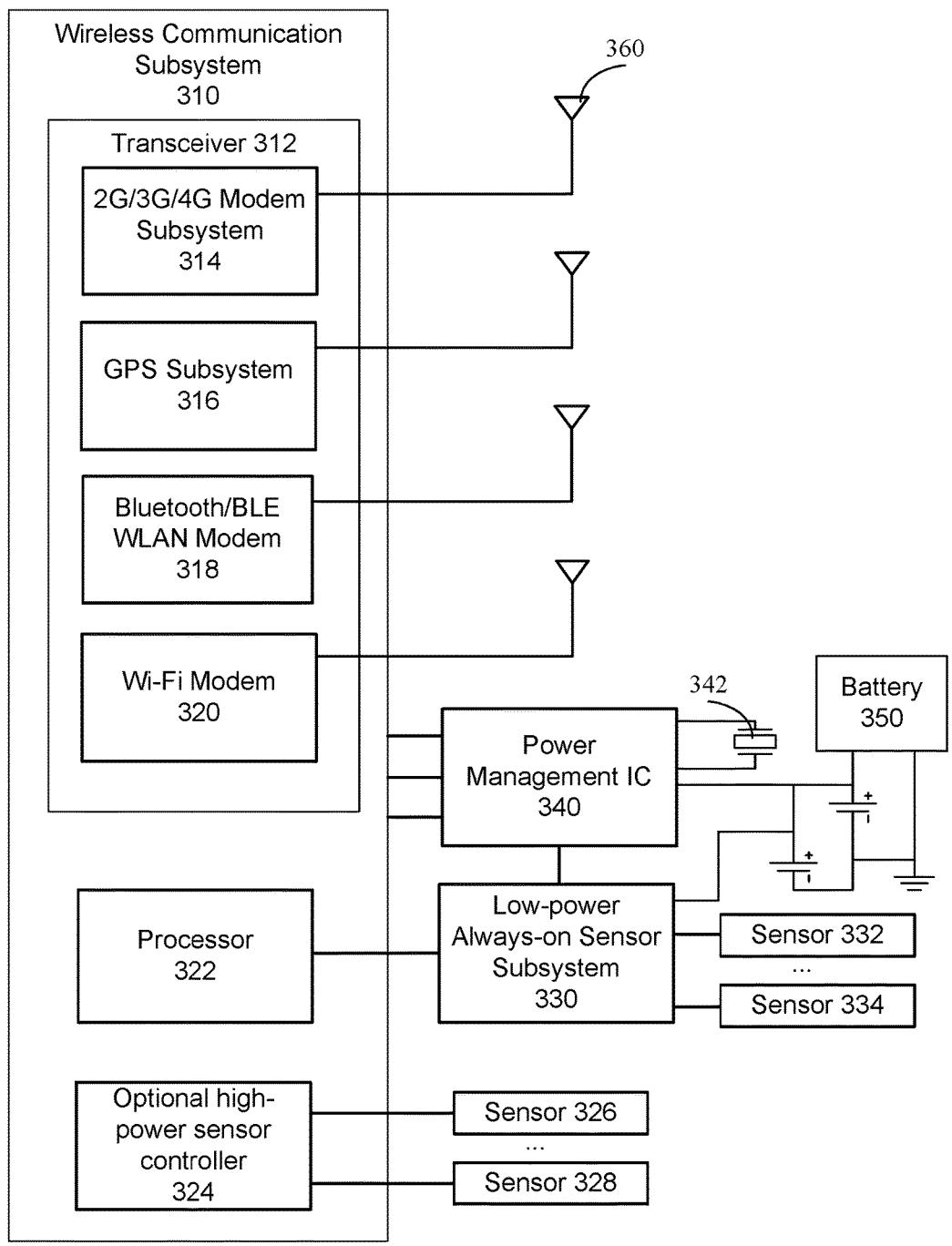
FIG. 3 illustrates a simplified block diagram for an example electronic tracking device, according to certain aspects of the present disclosure.

FIG. 3 illustrates a simplified block diagram for an example electronic tracking device 300, according to certain aspects of the present disclosure. ETD 300 may include a wireless communication subsystem 310, a low-power always-on sensor subsystem 330, a power management integrated circuit (IC) 340, and a battery 350. Wireless communication subsystem 310 may include a transceiver 312 that may include one or more of, for example, a modem subsystem 314 for 2G/3G/4G cellular communication, a GPS subsystem 316, a Bluetooth/BLE WLAN modem 318, and a Wi-Fi modem 320, and corresponding antennas 360. Wireless communication subsystem 310 may also include a processor 322 that may be used to control the operations of various modems of transceiver 312, for example, based on control signals from low-power always-on sensor subsystem 330. Optionally, wireless communication subsystem 310 may also include a high-power sensor controller 324 that can be used to control certain sensors (e.g., sensors 326 and 328) that may requires a higher power. Sensors that may require a higher power, such as certain biometric sensors, temperature sensors, or other sensors, may be powered down most of the time and may only be activated when needed, for example, based on the results from low-power always-on sensor subsystem 330, such as when a motion of ETD 300 is detected.

Processor 322 may control the operations of one or more modems described above. In some embodiments, processor 322 may use information received or collected by the one or more modems to determine the location of ETD 300. For example, processor 322 may use signals received from three or more satellites to determine the location of ETD 300. Processor 322 may use signals received from three or more base transceiver stations or access points to determine the location of ETD 300. Processor 322 may also use signals received from one or more Wi-Fi access points or one or more small cell access points to determine the location of ETD 300.

Low-power always-on sensor subsystem 330 may be connected to one or more low-power sensors, such as sensors 332 and 334. Low-power always-on sensor subsystem 330 and/or sensors 332 and 334 may be powered by battery 350 directly or indirectly through, for example, a voltage regulator or DC-to-DC converter in power management IC 340. In some embodiments, a low-power always-on sensor may consume very little power, such as, for example, less than one microwatt or less than one nanowatt. In some embodiments, the low-power always-on sensor may not consume any power before, for example, an acceleration occurs. For example, in some implementations, a sensor may include a circuit that may only be closed when the acceleration of the ETD is above a threshold value. For example, a sensor may include a cantilever that can act as a switch, and the circuit of the sensor may be closed to form a closed loop only when the acceleration causes the cantilever to move and touch an open end of the sensor circuit.

As described above with respect to power subsystem 220 of ETD 200, power management IC 340 may include one or more power management circuits, such as voltage regulators, DC-to-DC converters, wired (e.g., universal serial bus (USB) or micro USB) or wireless (NFC or Qi) charging circuits, energy harvest circuits, etc. Power management IC 340 may be powered directly or indirectly by battery 350. In some embodiments, power management IC 340 may include a real-time clock connected to a crystal oscillator 342, such as a watch crystal at a frequency of 32.768 kHz or a crystal at another frequency, such as 19.2 MHz. A higher-frequency real-time clock may consume more power than a low-frequency real-time clock, but a low-frequency crystal oscillator may be physically larger than a high-frequency crystal oscillator. The frequency of the real-time clock may be selected to compromise the power consumption of the real-time clock and the physical size of the crystal oscillator. The real-time clock may be used as a reference clock for other circuits on ETD 300. The real-time clock may also be used as a time base for a timer, or may be used to determine the current time for datalogging various events.

As also described above with respect to power subsystem 220 of ETD 200, battery 350 may include one or more rechargeable or non-rechargeable batteries, such as alkaline batteries, lead-acid batteries, lithium-ion batteries, zinc-carbon batteries, and NiCd or NiMH batteries.

It is noted that the embodiments of ETD described in FIGS. 2 and 3 are for illustration purposes only and are not meant to be limiting. Many components or modules may be omitted in FIGS. 2 and 3 in order not to obscure the features being described herein. One skilled in the relevant art will appreciate that the disclosed illustrative components are not meant to be an exhaustive identification of all the components required by or present in an ETD. Rather, illustrative components have been identified, in a non-limiting manner, to facilitate illustration of one or more aspects of the present disclosure. Furthermore, some components may be combined or implemented on a same circuit or device. For example, in some implementations, sensor hub 240 may be a portion of low-power controller 210. In some implementations, low-power controller 210 and wireless communication subsystem 230 may be implemented on a same integrated circuit.

Figure 4:
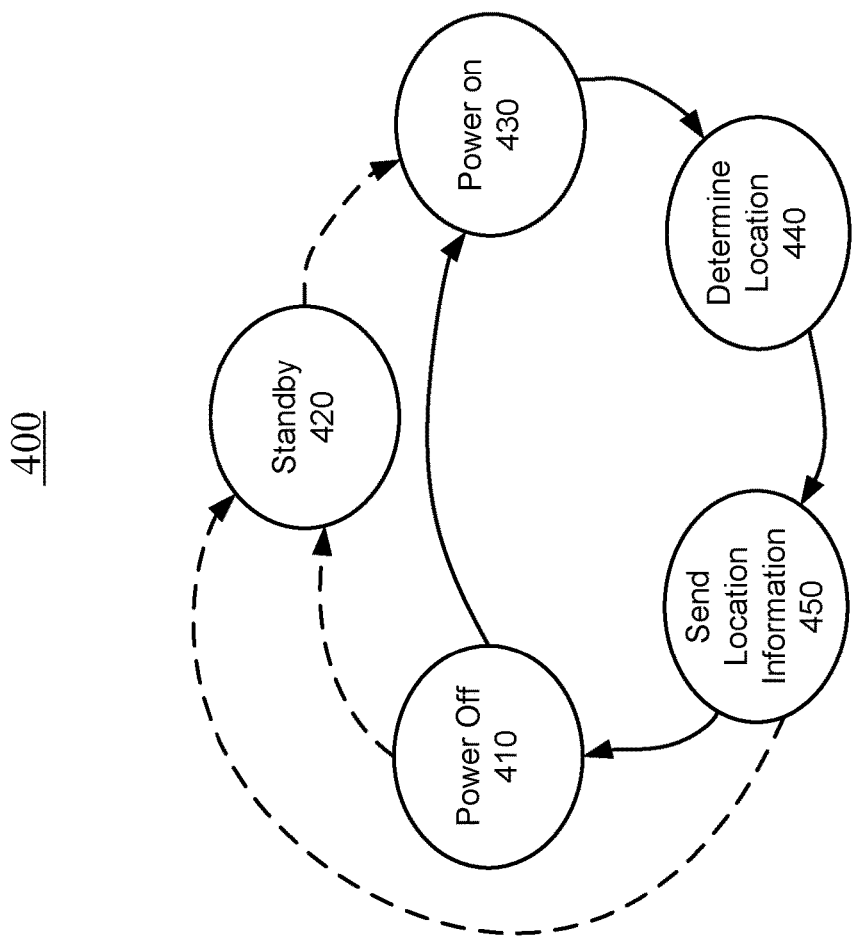
FIG. 4 illustrates an example state machine of an example electronic tracking device, according to certain aspects of the present disclosure.

FIG. 4 illustrates an example state diagram 400 of an example electronic tracking device, according to certain aspects of the present disclosure. In some embodiments, a low-power controller, such as low-power controller 210 of FIG. 2 or low-power always-on sensor subsystem 330 of FIG. 3, may implement a state machine or other control logic to control the operations of the ETD as shown in FIG. 4. As shown in FIG. 4, the ETD, or at least a wireless communication subsystem of the ETD, may be in a power-off state 410, where the wireless communication subsystem and/or some high-power sensors or circuits may be powered off completely. In power-off state 410, one or more low-power sensors, such as a motion sensor, may be activated to detect the motions of the ETD. The ETD may remain in power-off state 410 until a location of the ETD is to be determined and reported, for example, after a certain time period (e.g., 15 minutes, 30 minutes, 1 hour, or longer) since the last motion of the ETD is detected, or after a query is received while the ETD is in motion or in a standby mode.

When a controller, such as low-power controller 210 or low-power always-on sensor subsystem 330, determines that information regarding the location of the ETD is to be determined and reported to a server, ETD may enter a power-on state 430. In power-on state 430, the wireless communication subsystem and/or other sensors of the ETD may be powered on, such that information related to the location of the ETD and/or information such as excessive force applied to the ETD, may be determined and reported to a server. After being powered on, the ETD may then enter a location-determination state 440.

As described above, in some embodiments, in location-determination state 440, the wireless communication subsystem may determine the location of the ETD based on communications with other components of a tracking system (e.g., satellites, base transceiver stations, and access points), for example, using trilateration or triangulation techniques or based on location information of nearby Wi-Fi or small cell access point. In some embodiments, the ETD may collect information related to the location of the ETD (e.g., information regarding signals received from other components of the tracking system, such as an RSSI, RTT, or time of flight (ToF) of an RF signal, or an identification of a Wi-Fi or small-cell access point), and the server may determine the location of the ETD (e.g., based on the location of a nearby Wi-Fi or small-cell access point, or locations of multiple access points and the distances between the ETD and the multiple access points). In some embodiments, in location-determination state 440, the receiver portion of the wireless communication system may be turned on, but the transmitter portion of the wireless communication system is turned off. After the location of the ETD is determined or the information related to the location of the ETD is collected, the ETD may enter a sending-location-information state 450.

In some embodiments, in sending-location-information state 450, a transmitter of the wireless communication subsystem may be turned on and send the determined location information to the server through other components of the tracking system (e.g., base transceiver stations and access points). In some other embodiments, the ETD may send collected information (e.g., identification of a nearby access point) to the server (e.g., via the access point and a network), and the server may then determine the location of the ETD based on the collected information (e.g., based on the location of the access point). In some embodiments, the wireless communication subsystem may also send datalog information, such as, for example, the time when an initial motion is detected, the time when the wireless communication subsystem is turned on or off, or the time when an excessive force is detected.

After the location information is sent to the server, the ETD may return to power-off state 410, where the wireless communication subsystem and other circuits of the ETD may be powered off and only one or more low-power sensors may remain activated. When the location of the ETD is queried by a user, the server, rather than the ETD, may provide the last received or determined location of the ETD as the current location of the ETD.

In some cases, a server may want to know the current location of the ETD while the ETD is in motion. In such cases, in power-off state 410, if a motion of the ETD is detected, the ETD may enter a standby (i.e., sleep) state 420, where only a portion of the wireless communication subsystem (e.g., a receiver or a sniffer) and/or other components of the ETD may be activated, while other portions of the wireless communication subsystem and/or other components of the ETD are deactivated or powered off. In some embodiments, when a circuit or subsystem is deactivated, the circuit or subsystem may be completely powered down and may consume no power. In some other embodiments, when a circuit or subsystem is deactivated, the circuit or subsystem may not be completely powered down but may consume a low or minimum level of power. Before entering the standby mode, the wireless communication subsystem may first register with a wireless network and become communicatively accessible from the wireless network. In the standby mode, the wireless communication subsystem may remain communicatively accessible from the network, such that query from the server may be received and responded to. In this way, the wireless communication subsystem may consume a lower level of power, but may not need to be completely powered off and then powered back on between queries, as it may require more total energy (and a longer time, such as longer than 10 seconds) to power up and initialize the wireless communication subsystem than to maintain the wireless communication subsystem in the standby mode.

In standby state 420, if the ETD receives a query of its current location from the server while in motion, the ETD may enter power-on state 430 as described above. After the location-determination state 440 and sending-location-information state 450, the ETD may return to standby state 420, and wait for a new query or a determination that the ETD has not been in motion for a threshold period of time, before entering power-on state 430, location-determination state 440, and sending-location-information state 450 again. If the ETD has no motion during the threshold period of time, the ETD may enter power-off state 410 after leaving sending-location-information state 450.

Figure 5:
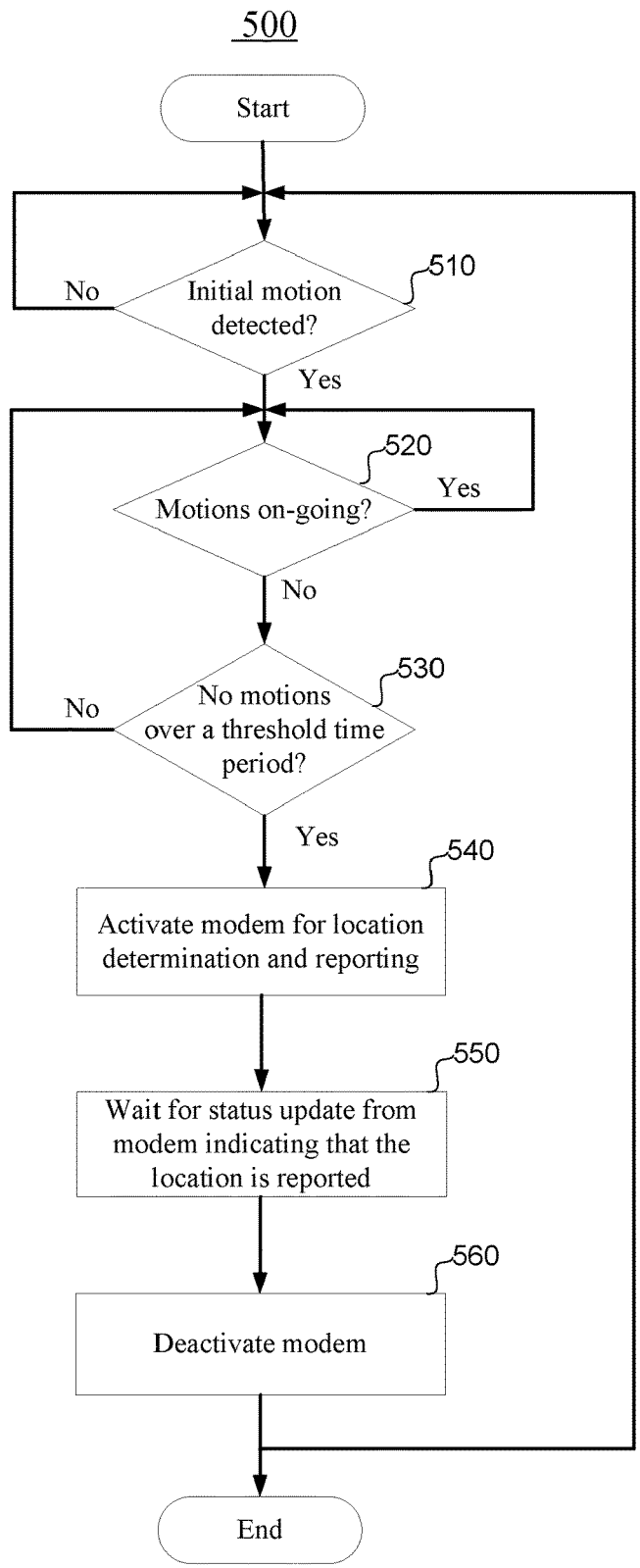
FIG. 5 is a flow chart illustrating an example method for reducing power consumption of an electronic tracking device, according to certain aspects of the present disclosure.

FIG. 5 is a flow chart 500 illustrating an example method for reducing power consumption of an electronic tracking device, according to certain aspects of the present disclosure. As shown in FIG. 5, at block 510, a controller of the ETD, such as low-power controller 210 of FIG. 2, may determine whether an initial motion of the ETD is detected by an always-on low-power motion sensor as described above with respect to FIGS. 2 and 3. If no motion is detected, the controller may remain in block 510 until an initial motion is detected, at which time the controller may proceed to block 520. In some embodiments, the controller may include a false detection prevention logic that can be used to prevent false motion detection and false activation of the wireless communication subsystem. For example, the controller may determine that a motion is not detected if the motion lasts less than, for example, 5 seconds, 10 seconds, 15 seconds, 30 seconds, or longer.

At block 520, the controller may continue to determine whether motions are continuously being detected by the always-on low-power motion sensor, for example, every one second, every 5 seconds, every 10 seconds, or longer. As described above, a false detection prevention logic may be used to prevent false detection of the motion. If a motion is detected, the controller may continue to monitor the output of the always-on low-power motion sensor, until no motion is detected by the always-on low-power motion sensor, at which time, the controller may proceed to block 530.

At block 530, the controller may determine the time that has passed since the last motion was detected. If the time that has passed since the last motion was detected is over a threshold time period, such as 30 minutes, 1 hour, 2 hours, or longer, the controller may proceed to block 540; otherwise, the controller may go back to block 520 and continue to determine whether a motion is detected. In some embodiments, the controller may include a timer or may be connected to a timer. When no motion is detected, the timer may continue to count. When a motion is detected, the controller may reset the timer or set the timer value to zero.

At block 540, the controller may turn on a wireless communication subsystem of the ETD, such as a modem for 2G/3G/4G cellular communication or a Wi-Fi modem as described above, and proceed to block 550. The wireless communication subsystem may then communicate with, for example, cellular base transceiver stations, Wi-Fi access points, or SPS satellites, to collect information for determining a location of the ETD. As described above, the wireless communication subsystem may determine the location of the ETD (e.g., using processor 322 of the wireless communication subsystem 310) and send the location information and/or other information (e.g., datalog) to a server (e.g., using a wireless modem of the wireless communication subsystem). After the location information has been sent, the wireless communication subsystem may send a status update to the controller to inform the controller that the location information reporting is complete.

At block 550, the controller may wait for the status update from the wireless communication subsystem. When the controller receives the status update from the wireless communication subsystem that indicates that the location information about the ETD has been reported to the server, the controller may proceed to block 560.

At block 560, the controller may deactivate (e.g., turn off) the wireless communication subsystem such that the wireless communication subsystem would consume little or no power. The always-on low-power sensor may remain activated. The controller may then go back to block 510 in a new loop to wait for a new motion of the ETD that is detected by the always-on low-power sensor. While the wireless communication subsystem is powered down, if the location of the ETD is queried by a user, the server may provide the last reported or determined location of the ETD as the current or last known location of the ETD to the user, in response to the query.

In this way, the wireless communication subsystem is only powered on to determine and report information regarding the location of the ETD when motions of the ETD have stopped for a threshold time period, and is powered off after the location information has been sent to a server. Thus, the duration that the wireless communication system is powered on can be reduced or minimized, and hence the power consumed by the wireless communication subsystem can be reduced or minimized. In other words, the wireless communication subsystem may only be fully powered on during a short time period when the location information is collected and reported to the server. At other times, the wireless communication subsystem may be at least partially or fully powered off.

Figure 6:
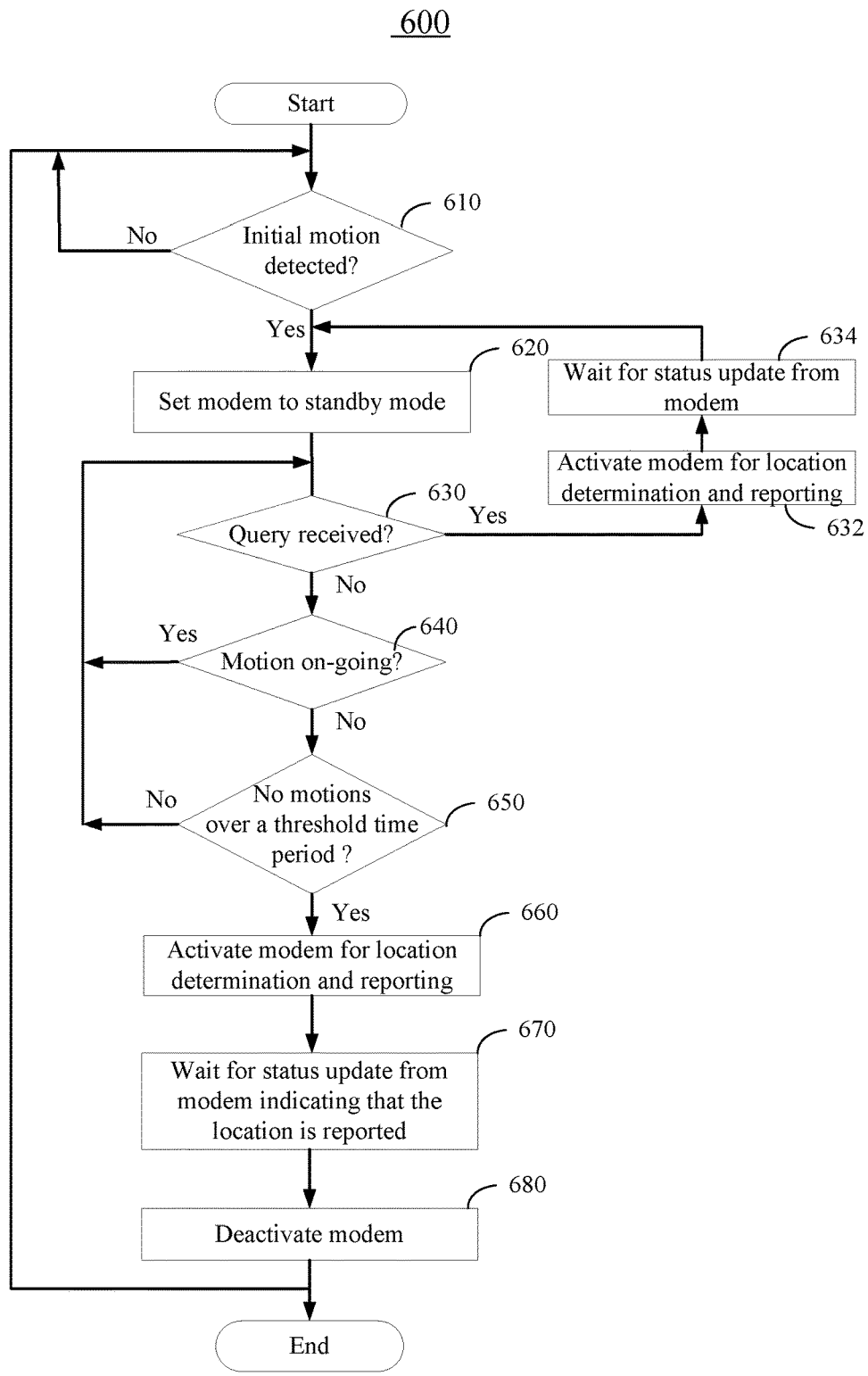
FIG. 6 is a flow chart illustrating an example method for reducing power consumption of an electronic tracking device, according to certain aspects of the present disclosure.

FIG. 6 is a flow chart 600 illustrating another example method for reducing power consumption of an electronic tracking device, according to certain aspects of the present disclosure. Flow chart 600 is similar to flow chart 500 in some aspects, but is different from flow chart 500 in that, for example, the ETD may respond to a query of its current location from a server and the wireless communication subsystem may either enter a standby (sleep) mode or a power-on mode, while the ETD is in motion.

At block 610, a controller of the ETD, such as low-power controller 210 of FIG. 2, may determine whether an initial motion of the ETD is detected by an always-on low-power motion sensor as described above with respect to FIGS. 2 and 3 and block 510 of FIG. 5. If no motion is detected, the controller may remain in block 610 until an initial motion is detected, at which time the controller may proceed to block 620. As described above, in some embodiments, the controller may include a false detection prevention logic that can be used to prevent false motion detection and false activation of the wireless communication subsystem. For example, the controller may determine that a motion is not detected if the motion lasts less than, for example, 5 seconds, 10 seconds, 15 seconds, 30 seconds, or longer.

At block 620, the controller may set a wireless communication subsystem of the ETD, such as a modem for 2G/3G/4G cellular communication or a Wi-Fi modem as described above, to a standby mode, where only a portion (e.g., a receiver portion) of the wireless communication subsystem may be activated, while other portions of the wireless communication subsystem are deactivated or powered off. In some embodiments, when a circuit or subsystem is deactivated, the circuit or subsystem may be completely powered down and may consume no power. In some other embodiments, when a circuit or subsystem is deactivated, the circuit or subsystem may not be completely powered down but may consume a low or minimum level of power. In various embodiments, before entering the standby mode, the wireless communication subsystem may first register with a wireless network and become communicatively accessible from the wireless network. In the standby mode, the wireless communication subsystem may remain communicatively accessible from the network, such that a query from the server may be received.

At block 630, the controller may determine whether a query of the location of the ETD has been received, for example, from a server. In some embodiments, the query may be received by the ETD from, for example, a cellular base transceiver station or a Wi-Fi access point, through, for example, the receiver portion of the communicatively accessible wireless communication subsystem. If no query has been received, the controller may proceed to block 640. If a query has been received, the controller may proceed to block 632.

At block 632, the controller may wake up or otherwise activate the wireless communication subsystem and then proceed to block 634. The activated wireless communication subsystem may communicate with, for example, cellular base transceiver stations, Wi-Fi access points, or SPS satellites, for collecting and/or determining location information of the ETD and sending the location information to a server. After the location information has been sent, the wireless communication subsystem may send a status update regarding its state to the controller.

At block 634, the controller may wait for a status update from the wireless communication subsystem. When the controller receives the update indicating that the location information about the ETD has been transmitted to the server, the controller may proceed to block 620, where the wireless communication subsystem is set back to the standby mode. In some embodiments, the controller may only respond to queries from a server and deny queries directly from users. Because the ETD does not directly respond to the queries from users who may query the location of the ETD often, the power consumption of the ETD may be reduced.

At block 640, the controller may determine whether motions are continuously being detected by the always-on low-power motion sensor. If motions are continuously being detected, the controller may continue to monitor the query of the location of the ETD from a server at block 630, and monitor the output of the always-on low-power motion sensor at block 640. If no motion is detected by the always-on low-power motion sensor at block 640, the controller may proceed to block 650.

At block 650, the controller may determine the time that has passed since the last motion was detected. If the time that has passed since the last motion was detected is over a threshold period of time, such as 30 minutes, 1 hour, 2 hours, or longer, the controller may proceed to block 660; otherwise, the controller may go back to block 630 and determine whether a query is detected. In some embodiments, the controller may include a timer or may be connected to a timer. When no motion is detected, the timer may continue to count. When a motion is detected, the controller may reset the timer or set the timer value to zero. The threshold time period may be determined based on, for example, the power consumption of the ETD in the standby mode and the energy used to power up and initialize the wireless communication subsystem (including registering the wireless communication subsystem with a wireless network). For example, if the energy used to power up and initialize the wireless communication subsystem is higher, the threshold time period may be set to a longer time period such that the wireless communication subsystem may be powered up and initialized less frequently.

At block 660, the controller may wake up or otherwise activate the wireless communication subsystem and proceed to block 670. The activated wireless communication subsystem may then communicate with, for example, cellular base transceiver stations, Wi-Fi access points, or SPS satellites, for determining location information of the ETD and sending the location information to a server. As described above, in some embodiments, the wireless communication subsystem may also send datalog collected by various sensors to the server. After the location information has been sent, the wireless communication subsystem may send an update indicating the completion of reporting the location information and other information to the controller.

At block 670, the controller may wait for an update from the wireless communication subsystem that indicates that the location information about the ETD has been transmitted to the server. When the controller receives the update, the controller may proceed to block 680.

At block 680, the controller may deactivate (e.g., completely turn off) the wireless communication subsystem such that the wireless communication subsystem would not consume any power. The always-on low-power sensor may remain activated. The controller may then go back to block 610 in a new loop to wait for a new motion of the ETD that is detected by the always-on low-power sensor. While the wireless communication subsystem is powered down, if the location of the ETD is queried, the ETD may not respond to the query. The server may provide the last reported or determined location of the ETD as the current or last known location of the ETD to a user, because no motion has been detected and thus the ETD may not have been moved since the location information of the ETD was last reported or determined.

Figure 7:
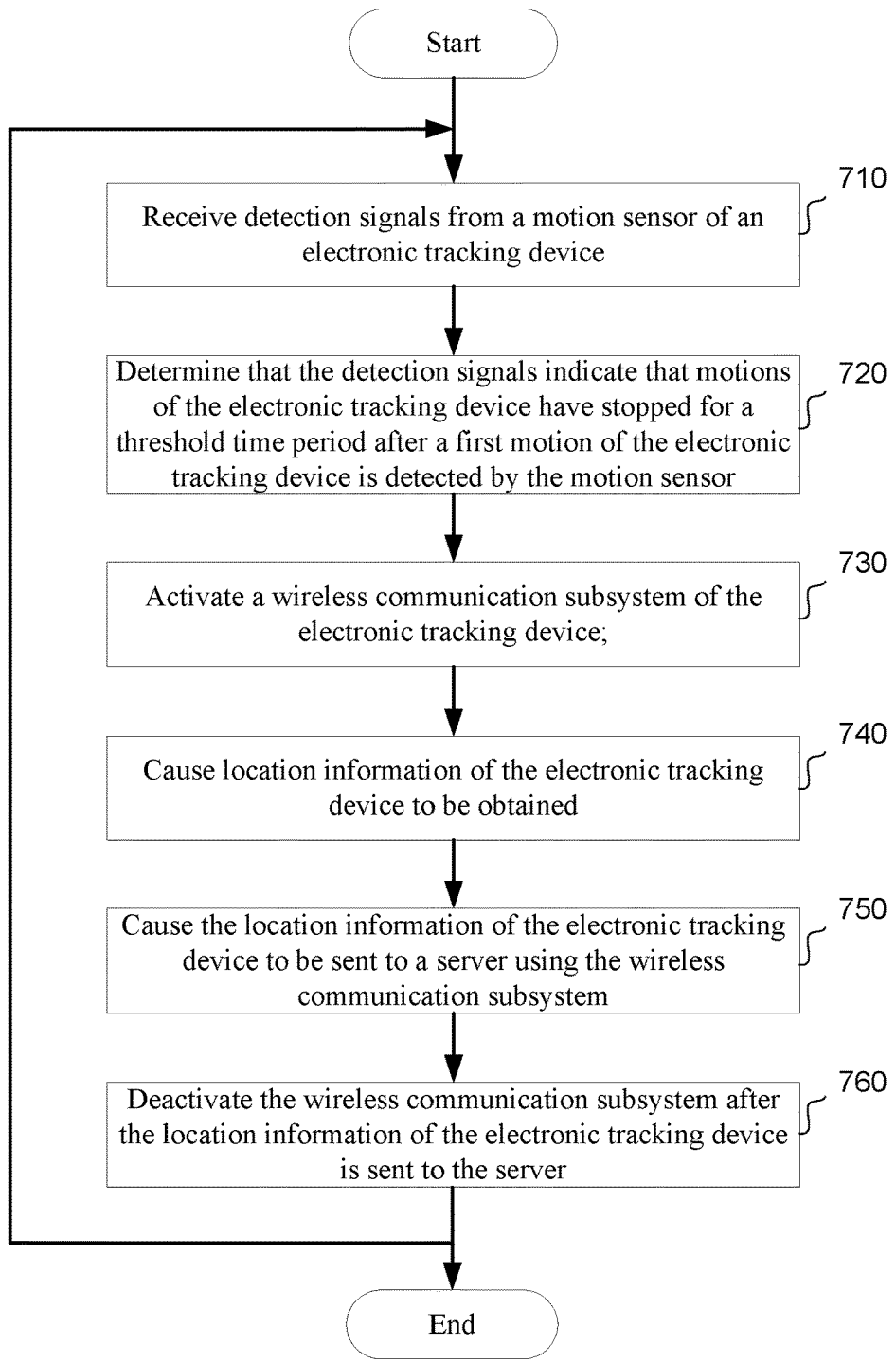
FIG. 7 is a flow chart illustrating an example method for reducing power consumption of an electronic tracking device, according to certain aspects of the present disclosure.

FIG. 7 is a flow chart 700 illustrating an example method for reducing power consumption of an electronic tracking device, according to certain aspects of the present disclosure. At block 710, a controller of the ETD, such as low-power controller 210 of FIG. 2, may continuously receive detection signals from a motion sensor of the electronic tracking device. The motion sensor may include, for example, an accelerometer, a gyroscope, or a velocimeter. The motion sensor may be an always-on low-power motion sensor as described above with respect to FIGS. 2 and 3. The low-power motion sensor may consume very little power, such as, for example, less than one microwatt or less than one nanowatt.

At block 720, the controller may determine, based on the detection signals, whether motions of the electronic tracking device have stopped for a threshold time period after a first motion of the electronic tracking device is detected by the motion sensor. If the detection signals indicate that a motion is detected, the controller may continue to receive and monitor detection signals from the motion sensor, until no motion is detected by the motion sensor. The controller may then determine the time that has passed since the last motion was detected, for example, using a timer. If the time that has passed since the last motion was detected is over the threshold time period, such as 30 minutes, 1 hour, 2 hours, or longer, the controller may proceed to block 730. If a motion is detected during the threshold time period, the controller may reset the timer or set the timer value to zero, and continue to receive and monitor detection signals from the motion sensor.

At block 730, the controller may activate a wireless communication subsystem of the ETD, such as a modem for 2G/3G/4G cellular communication or a Wi-Fi modem as described above. As described above with respect to FIGS. 5 and 6, the wireless communication subsystem may have been powered off or may have been in a sleep or standby mode before being activated. The controller may activate the wireless communication subsystem by powering on or waking up the wireless communication subsystem.

At block 740, the controller may cause location information of the electronic tracking device to be obtained. For example, the controller may instruct or request the wireless communication subsystem to obtain the location information of the electronic tracking device. As described above, the wireless communication subsystem may determine the location of the ETD, for example, using processor 322 of wireless communication subsystem 310. The wireless communication subsystem may determine the location of the ETD based on communications with other components of a tracking system (e.g., satellites, base transceiver stations, and access points), for example, using trilateration or triangulation techniques or based on location information of nearby Wi-Fi or small cell access point. In some embodiments, the wireless communication subsystem may collect information related to the location of the ETD (e.g., information regarding signals received from other components of the tracking system, such as an RSSI, RTT, or time of flight (ToF) of an RF signal, or an identification of a Wi-Fi or small-cell access point) for a server to determine the location of the ETD (e.g., based on the location of a nearby Wi-Fi or small-cell access point, or locations of multiple access points and the distances between the ETD and the multiple access points).

At block 750, the controller may cause the location information of the electronic tracking device to be sent to a server using the wireless communication subsystem. For example, the controller may instruct or request the wireless communication subsystem to send the obtained location information and/or other information (e.g., datalog) to the server (e.g., using a wireless modem of the wireless communication subsystem). The obtained location information sent to the server may include the determined location of the ETD, or information related to the location of the ETD that can be used by the server to determine the location of the ETD. After the location information has been sent to the server, the wireless communication subsystem may send a status update to the controller to inform the controller that the location information reporting is complete.

At block 760, after receiving the status update from the wireless communication subsystem indicating that the location information about the ETD has been sent to the server, the controller may deactivate (e.g., turn off) the wireless communication subsystem such that the wireless communication subsystem would consume little or no power. The motion sensor may remain activated. The controller may then go back to block 710 in a new loop to wait for new detection signals from the motion sensor. While the wireless communication subsystem is powered down, if the location of the ETD is queried by a user, the server may provide the last reported or determined location of the ETD as the current or last known location of the ETD to the user, in response to the query.

In this way, the wireless communication subsystem is only activated to determine and report information regarding the location of the ETD when motions of the ETD have stopped for a threshold time period, and is deactivated after the location information has been sent to a server. Thus, the wireless communication subsystem may only be fully powered on during a short time period when the location information is collected and reported to the server. At other times, the wireless communication subsystem may be at least partially or fully powered off.

It is noted that even though FIGS. 5-7 describe the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

In various embodiments, means for performing the operations in FIGS. 5-7 may include, for example, ETDs 200 and 300, and more specifically, low-power controller 210 or low-power always-on sensor subsystem 330, by using various sensors, wireless communication subsystems, cellular base transceiver stations, Wi-Fi or small cell access points, wireless transceivers, SPS satellites, communication networks, and servers described above with respect to FIGS. 1-3.

Figure 8:
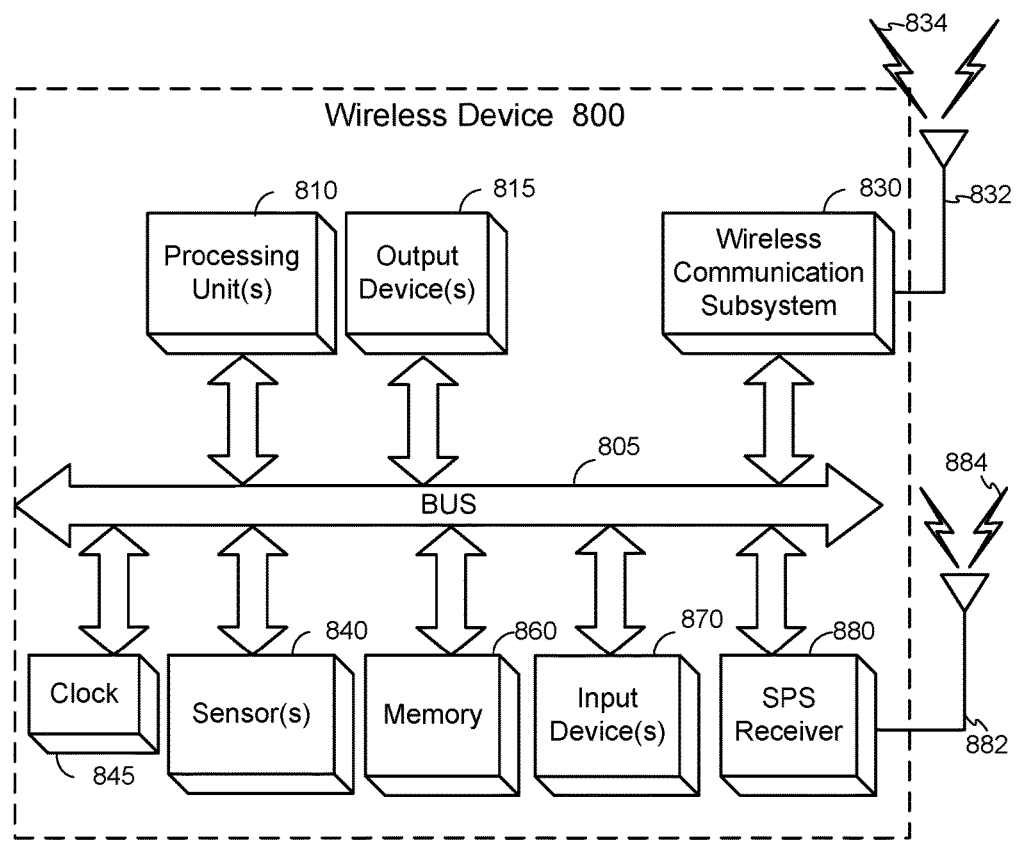
FIG. 8 is a block diagram of an example wireless device for implementing some of the examples described herein.

FIG. 8 is a block diagram of an example wireless device 800 for implementing some of the examples described herein. For example, embodiments previously provided herein, such as electronic tracking devices 200 and 300, may be implemented in wireless device 800. It should be noted that FIG. 8 is meant only to provide a generalized illustration of various components, any or all of which may be utilized as appropriate.

Wireless device 800 is shown comprising hardware elements that can be electrically coupled via a bus 805 (or may otherwise be in communication, as appropriate). The hardware elements may include processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. Wireless device 800 also can include one or more input devices 870, which can include without limitation a connector interface, a touch pad, microphone, button(s), dial(s), switch(es), and/or the like; and one or more output devices 815, which can include without limitation a display, light emitting diodes (LEDs), speakers, and/or the like.

Wireless device 800 might also include a wireless communication subsystem 830, which can include without limitation a modem, a network card, an infrared communication device, a wireless communication device, and/or a chipset (such as a Bluetooth device, an Institute of Electrical and Electronics Engineers (IEEE) 802.11 device (e.g., a device utilizing one or more of the 802.11 standards described herein), an IEEE 802.15.4 device, a Wi-Fi device, a WiMax device, cellular communication facilities, etc.), and/or the like. Wireless communication subsystem 830 may permit data to be exchanged with a network, wireless access points, other computer systems, and/or any other electronic devices described herein, such as the tracking system of FIG. 1. The communication can be carried out via one or more wireless communication antenna(s) 832 that send and/or receive wireless signals 834.

Depending on desired functionality, wireless communication subsystem 830 can include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technologies (RATs). An OFDMA network may employ Long-Term Evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Wireless device 800 may include a clock 845 on bus 805, which can generate a signal to synchronize various components on bus 805. Clock 845 may include an inductor-capacitor (LC) oscillator, a crystal oscillator, a ring oscillator, a digital clock generator such as a clock divider or clock multiplexer, a phase locked loop, or other clock generator. Clock 845 may be synchronized (or substantially synchronized) with corresponding clocks on other wireless devices. Clock 845 may be driven by wireless communication subsystem 830, which may be used to synchronize clock 845 of wireless device 800 to one or more other devices. Clock 845 may be used for controlling the operation of the electronic circuits of the electronic tracking device according to embodiments of this disclosure.

Wireless device 800 can further include sensor(s) 840. Such sensors can include, without limitation, one or more accelerometer(s), gyroscope(s), camera(s), magnetometer(s), altimeter(s), microphone(s), proximity sensor(s), light sensor(s), and the like. Some or all of sensor(s) 840 can be utilized, among other things, for motion detection, force detection, environment monitoring, and/or positioning.

Embodiments of the mobile device may also include a Standard Positioning Service (SPS) receiver 880 capable of receiving signals 884 from one or more SPS satellites using an SPS antenna 882. SPS receiver 880 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 880 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Wireless device 800 may further include and/or be in communication with a memory 860. Memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Memory 860 of wireless device 800 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIG. 8 might be implemented as code and/or instructions executable by wireless device 800, a processing unit within wireless device 800, and/or another device of a wireless system. In an aspect, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. An electronic tracking device comprising:
   a controller;
   a motion sensor in communication with the controller, the motion sensor configured to detect a motion of the electronic tracking device; and
   a wireless communication subsystem in communication with the controller,
   wherein the controller is configured to:
   (a) activate the wireless communication subsystem, when no motion of the electronic tracking device has been detected by the motion sensor for a threshold time period after a first motion of the electronic tracking device is detected by the motion sensor;
   (b) cause location information of the electronic tracking device to be obtained;
   (c) cause the location information of the electronic tracking device to be sent to a server using the wireless communication subsystem;
   (d) deactivate the wireless communication subsystem after the location information of the electronic tracking device is sent to the server; and
   (e) after a motion of the electronic tracking device is detected by the motion sensor while the wireless communication subsystem is deactivated,
   power up the wireless communication subsystem;
   cause the wireless communication subsystem to register with a wireless network; and
   subsequently set the wireless communication subsystem to a standby mode.

2. The electronic tracking device of claim 1, wherein the controller is further configured to repeat operations (a)-(d) in a loop, and wherein the wireless communication subsystem remains deactivated between iterations of the loop.

3. The electronic tracking device of claim 1, wherein the motion sensor includes at least one of an accelerometer, a gyroscope, or a velocimeter.

4. The electronic tracking device of claim 1, wherein the motion sensor is an low-power sensor that is powered on when the wireless communication subsystem is deactivated.

5. The electronic tracking device of claim 1, wherein the controller includes a false detection prevention logic to prevent false motion detection.

6. The electronic tracking device of claim 1, wherein the motion sensor has a power consumption less than 1 nanowatt.

7. The electronic tracking device of claim 1, wherein the wireless communication subsystem includes at least one of a cellular communication subsystem, a Wi-Fi communication subsystem, or a Satellite Positioning System (SPS) communication subsystem.

8. The electronic tracking device of claim 1, wherein:
   the location information of the electronic tracking device is obtained by the wireless communication subsystem; and
   the wireless communication subsystem includes a processor for determining a location of the electronic tracking device.

9. The electronic tracking device of claim 1, wherein:
   in the standby mode, the wireless communication subsystem is communicatively accessible via the wireless network.

10. The electronic tracking device of claim 1, wherein the controller is further configured to, in response to a query of the location information of the electronic tracking device,
   activate the wireless communication subsystem from the standby mode;
   cause the location information of the electronic tracking device to be determined and transmitted to the server; and
   set the wireless communication subsystem back to the standby mode.

11. The electronic tracking device of claim 10, wherein the controller responds to a query from the server, but denies a query directly from a user.

12. The electronic tracking device of claim 1, wherein the threshold time period is determined based on energy used to power up and initialize the wireless communication subsystem and power consumption of the electronic tracking device in the standby mode.

13. The electronic tracking device of claim 1, further comprising:
   an alarm signal generator configured to generate an alarm signal when a query of the location information of the electronic tracking device is received or when an abnormal event is detected.

14. The electronic tracking device of claim 1, further comprising:
   a sensor configured to generate a detection signal indicating whether the electronic tracking device is on an aircraft,
   wherein the controller is further configured to, when the detection signal indicates that the electronic tracking device is on an aircraft, set the wireless communication subsystem to the standby mode or deactivate the wireless communication subsystem.

15. The electronic tracking device of claim 1, further comprising at least one of an ambient light sensor, a pressure sensor, a vibration sensor, a temperature sensor, a humidity sensor, a shock sensor, a chemical sensor, or a biometric sensor.

16. The electronic tracking device of claim 1, further comprising a sensor hub coupled to the controller and at least one of the motion sensor, an ambient light sensor, a pressure sensor, a vibration sensor, a temperature sensor, a humidity sensor, a shock sensor, a chemical sensor, or a biometric sensor.

17. A method comprising:
   receiving detection signals from a motion sensor of an electronic tracking device;
   determining that the detection signals indicate that motions of the electronic tracking device have stopped for a threshold time period after a first motion of the electronic tracking device is detected by the motion sensor;
   activating a wireless communication subsystem of the electronic tracking device;
   causing location information of the electronic tracking device to be obtained;
   causing the location information of the electronic tracking device to be sent to a server using the wireless communication subsystem;
   deactivating the wireless communication subsystem after the location information of the electronic tracking device is sent to the server; and
   in response to the detection signals indicating that a motion of the electronic tracking device has been detected while the wireless communication subsystem is deactivated,
      powering up the wireless communication subsystem;
      causing the wireless communication subsystem to register with a wireless network; and
      subsequently setting the wireless communication subsystem to a standby mode.

18. The method of claim 17, wherein the motion sensor includes at least one of an accelerometer, a gyroscope, or a velocimeter.

19. The method of claim 17, wherein the wireless communication subsystem includes at least one of a cellular communication subsystem, a Wi-Fi communication subsystem, or a Satellite Positioning System (SPS) communication subsystem.

20. The method of claim 17, further comprising:
   in response to a query of the location information of the electronic tracking device, activating the wireless communication subsystem from the standby mode;
   causing the location information of the electronic tracking device to be determined and transmitted to the server; and
   setting the wireless communication subsystem back to the standby mode.

21. The method of claim 17, further comprising, when the detection signals from the motion sensor indicate that no motions of the electronic tracking device have been detected for the threshold time period,
   activating the wireless communication subsystem from the standby mode;
   causing the location information of the electronic tracking device to be determined and transmitted to the server; and
   deactivating the wireless communication subsystem.

22. The method of claim 17, further comprising:
   generating an alarm signal when a query of the electronic tracking device is received or when an abnormal event is detected.

23. The method of claim 17, further comprising:
   receiving, from a second sensor, a detection signal indicating whether the electronic tracking device is on an aircraft; and
   in response to the detection signal indicating that the electronic tracking device is on the aircraft, setting the wireless communication subsystem to the standby mode or deactivating the wireless communication subsystem.

24. An apparatus comprising:
   means for detecting motions of an object;
   means for receiving detection signals from the means for detecting motions;
   means for obtaining and reporting location information of the object to a server;
   means for determining that motions of the object have stopped for a threshold period of time based on the detection signals;
   means for activating the means for obtaining and reporting location information, when motions of the object have stopped for the threshold period of time after a first motion of the object is detected;
   means for deactivating the means for obtaining and reporting the location information after the location information of the object is reported to the server; and
   means for, in response to detecting a motion of the object while the means for obtaining and reporting the location information is deactivated,
      powering up the means for obtaining and reporting the location information;
      causing the means for obtaining and reporting the location information to register with a wireless network; and
      subsequently setting the means for obtaining and reporting the location information to a standby mode.

25. The apparatus of claim 24, further comprising:
   means for causing the means for obtaining and reporting the location information to register with the wireless network;

means for, in response to a query of the location information of the object, activating the means for obtaining and reporting the location information from the standby mode;

means for causing the location information of the object to be determined and reported to the server; and means for setting the means for obtaining and reporting the location information back to the standby mode.

26. A non-transitory computer-readable storage medium comprising machine-readable instructions stored thereon, the instructions, when executed by one or more processing units, causing the one or more processing units to:

receive detection signals from a motion sensor of an electronic tracking device;

determine that the detection signals indicate that motions of the electronic tracking device have stopped for a threshold period of time after a first motion of the electronic tracking device is detected by the motion sensor;

activate a wireless communication subsystem of the electronic tracking device;

cause location information of the electronic tracking device to be obtained;

cause the location information of the electronic tracking device to be sent to a server using the wireless communication subsystem;

deactivate the wireless communication subsystem after the location information of the electronic tracking device is sent to the server; and when the detection signals indicate that a motion of the electronic tracking device has been detected while the wireless communication subsystem is deactivated, power up the wireless communication subsystem;

cause the wireless communication subsystem to register with a wireless network; and subsequently set the wireless communication subsystem to a standby mode.

27. The non-transitory computer-readable storage medium of claim 26, wherein the instructions, when executed by the one or more processing units, further cause the one or more processing units to, in response to a query of the location information of the electronic tracking device, activate the wireless communication subsystem from the standby mode;

cause the location information of the electronic tracking device to be determined and transmitted to the server; and set the wireless communication subsystem to the standby mode.

* * * * *